July 2, 1935.　　　　I. E. ASKE　　　　2,006,431
HEATER
Filed Aug. 11, 1933　　2 Sheets-Sheet 2
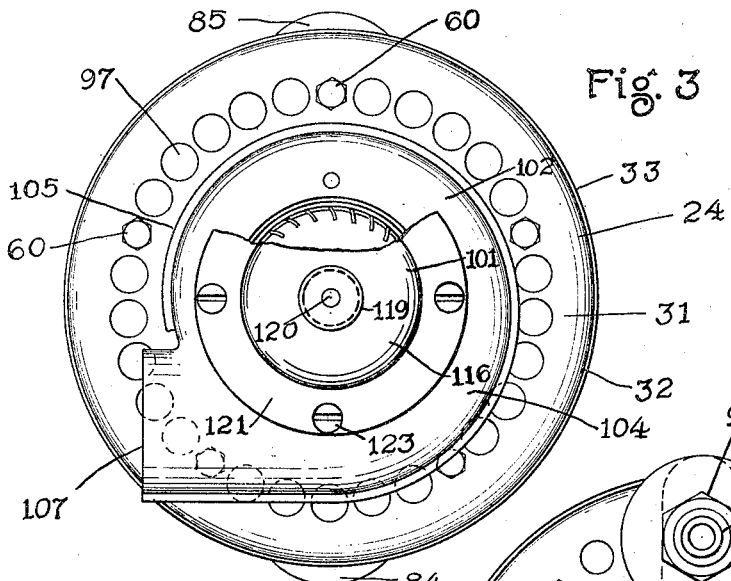
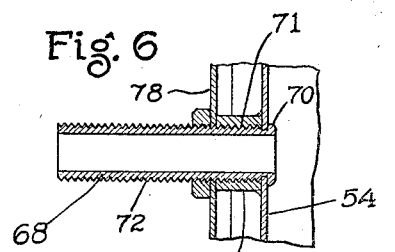
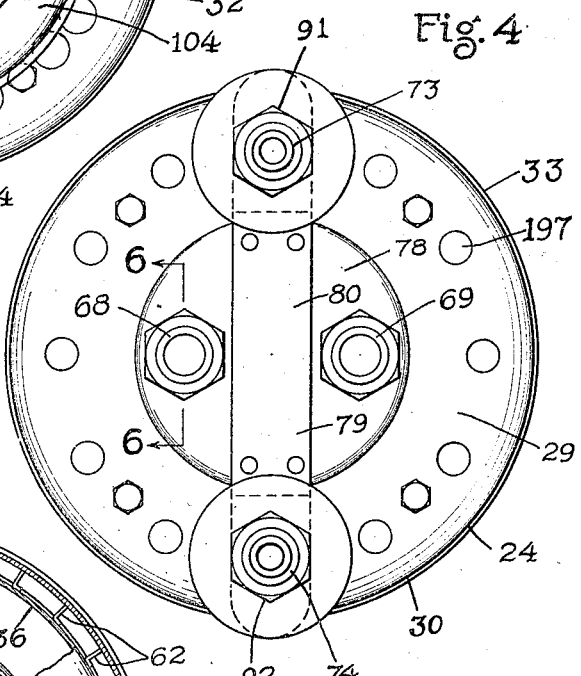
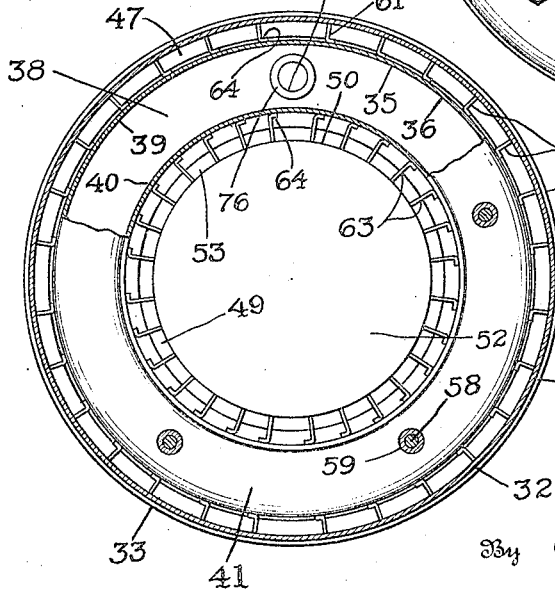
Inventor
Irving E. Aske
By Caswell & Lagaard
Attorneys Patented July 2, 1935

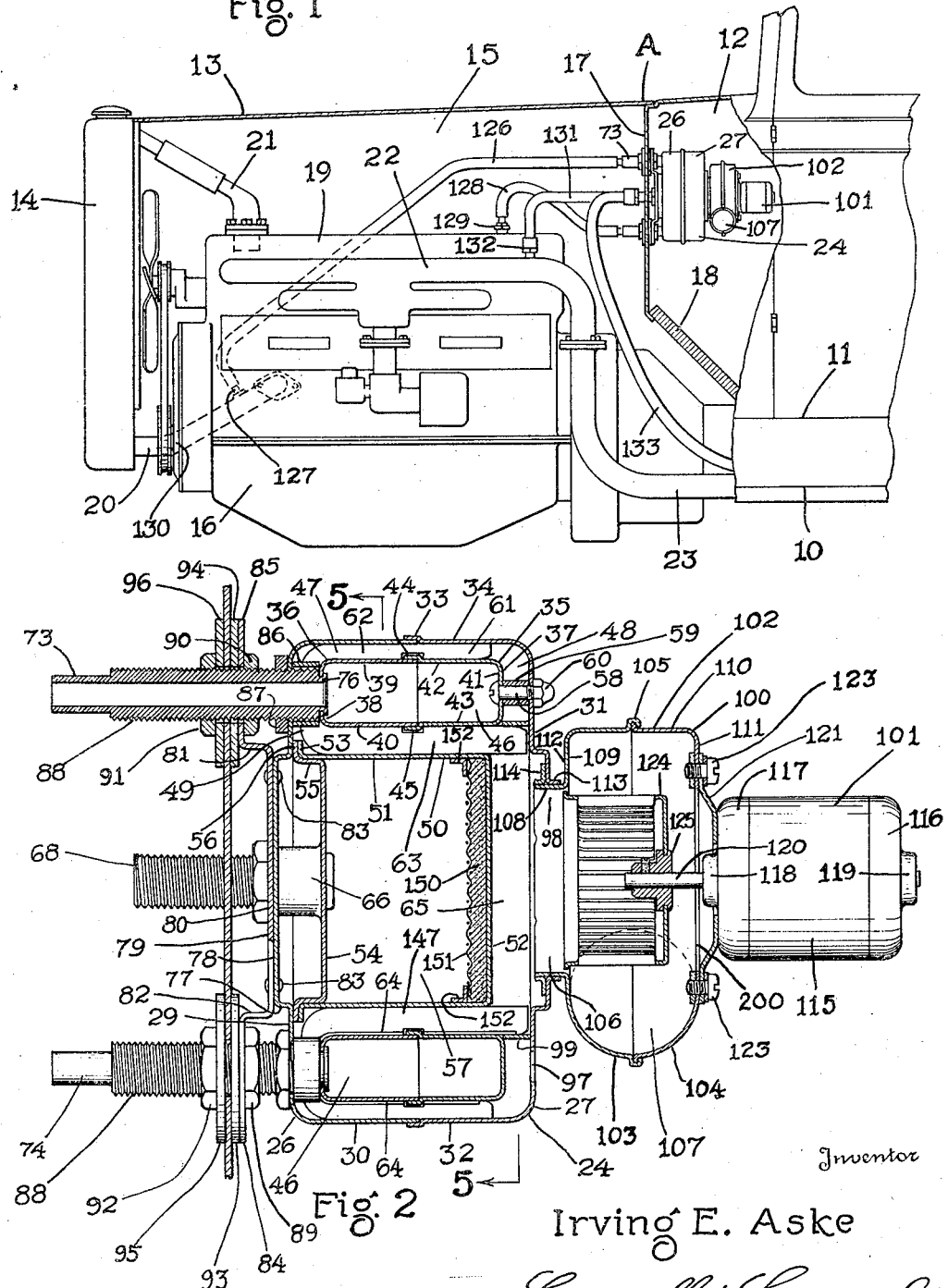

2,006,431

UNITED STATES PATENT OFFICE 2,006,431

HEATER

Irving E. Aske, Detroit, Mich., assignor to Polaris Iron Company, Duluth, Minn., a corporation of Delaware Application August 11, 1933, Serial No. 684,673

18 Claims. (Cl. 257—137)

My invention relates to heaters and particularly to heaters for use in motor vehicles.

An object of the invention resides in providing a heater utilizing both the heat from the exhaust gas of the motor vehicle and the cooling fluid thereof.

Another object of the invention resides in providing two radiators, one connected to the exhaust system of the motor vehicle and the other connected to the cooling system of the vehicle and arranged to both heat and cool the air circulated.

An object of the invention resides in disposing the radiators in close proximity to one another.

A still further object of the invention resides in causing one of the radiators to envelop the other radiator and in spacing said last named radiator from the first named radiator to leave an air circulating passageway therebetween.

A feature of the invention resides in constructing the inner radiator cylindrical and the outer radiator toroidal in shape, to leave an annular air circulating passageway therebetween.

An object of the invention resides in providing a cylindrical shell extending about the toroidal radiator and spaced from the ends and outer wall thereof to provide another annular air circulating passageway upon the exterior of the toroidal radiator.

A feature of the invention resides in spacing one of the end walls of the cylindrical radiator from one of the end walls of the shell to provide a radial air circulating passageway therebetween communicating with said first named annular air circulating passageway.

Another object of the invention resides in providing openings in said walls bringing one of said radial passageways of the toroidal radiator into communication with the exterior.

An object of the invention resides in constructing said wall with another opening communicating with the radial passageway.

A feature of the invention resides in providing a blower to said end and in attaching said blower to said end wall of the shell so as to cause the blower to circulate air through the opening in said wall communicating with the radial passageway of said cylindrical radiator.

An object of the invention resides in rotatably mounting said blower about an axis concentric with the axis of said opening and in providing a motor upon the exterior of the blower for supporting the said rotor serving as a handle for rotating the blower.

A still further object of the invention resides in providing four nipples communicating with the two radiators and arranged in the form of a rhomboid.

A feature of the invention resides in connecting the diagonally opposed nipples to the same radiator.

Other objects of the invention reside in the novel combination and arrangement of parts and in the details of construction hereinafter illustrated and/or described.

In the drawings:

Fig. 1 is an elevational sectional view of a portion of a motor vehicle illustrating the application of my invention thereto.

Fig. 2 is an elevational sectional view of the radiator taken through the center of the same and drawn to a larger scale.

Fig. 3 is a front elevational view of the structure shown in Fig. 2.

Fig. 4 is a rear elevational view of the structure shown in Fig. 3 and removed from the vehicle.

Fig. 5 is a cross sectional view taken on line 5—5 of Fig. 2.

Fig. 6 is a detail sectional view illustrating the method of connecting certain of the nipples to their respective radiators.

In the use of exhaust automobile heaters the temperature of the air when leaving the heater is usually far too high. With a heater operated from the cooling system of the engine, the temperature of the air delivered is frequently too low, particularly when the vehicle is traveling at a high rate of speed. It has heretofore been found necessary to prevent the circulation of air through the radiator of the cooling system of the motor vehicle to raise the temperature of the air coming from the heater to such extent as to cause the non-freezing preparation to be evaporated from the cooling liquid. The present invention provides a heater by means of which the heat lost from the exhaust system and cooling system may be most advantageously utilized and in which the cooling liquid serves to temper the air and to deliver the same in the cab at the proper temperature.

For the purpose of illustrating the application of my invention, I have shown in Fig. 1 a portion of a motor vehicle indicated by the reference character A. This motor vehicle comprises a chassis 10 which carries a body 11 of the usual construction. The body 11 is provided with a cab 12 and is constructed with a hood 13 at the forward end thereof operating in conjunction with the radiator 14 to provide a compartment 15 in which the engine 16 of the vehicle is disposed. The body 11 is further constructed with a dash 17 separating the cab 12 from the compartment 15 and with a floor 18 extending up to the said dash 17. The engine 16 is of the usual construction and is provided with a water jacket 19. This water jacket communicates through an inlet pipe 20 with the radiator 14. The cooling liquid passes from the radiator 14 through a pipe 21 and back into the upper portion of the water jacket 19. The exhaust system of the engine is such as is usually found on motor vehicles and has hence not been illustrated or described in detail. The exhaust manifold, is shown at 22 which is connected to an exhaust pipe 23 leading to the muffler of the engine which is not illustrated.

My invention proper comprises a shell 24 which serves as a case to receive the various parts of the heater by means of which transfer of heat is had between the exhaust gas and the cooling liquid and the air to be circulated. The shell 24 is constructed in two parts 26 and 27. Part 26 is provided with a radial wall 29 and a cylindrical wall 30 extending outwardly therefrom. The part 27 of shell 24 is similarly constructed with a radial wall 31 and a cylindrical wall 32 integral with it. The two walls 30 and 22 are connected together as indicated at 33 and form in conjunction a cylindrical wall 34 of the full width of the shell.

Within the shell 24 is disposed a toroidal shaped radiator 35. This radiator is constructed in two parts 36 and 37 similar to the shell 24. The part 36 is provided with a radial wall 38 and two annular walls 39 and 40. Part 37 is similarly constructed with a radial wall 41 and two annular walls 42 and 43. The annular wall 42 is joined to the annular wall 39 and likewise the wall 43 is joined to the wall 40 through joints indicated at 44 and 45 to provide a chamber 46 within the interior of the radiator. The joints 44 and 45 are either welded or brazed together to form an integral construction and a fluid tight connection therebetween. The walls 39 and 42 of radiator 35 are spaced from the wall 34 of shell 24 to provide an annular air circulating passageway 47 therebetween. Likewise the end walls 37 and 38 of the radiator 35 are spaced from the end walls 31 and 29 of shell 24 to provide two radial passageways 48 and 49 between the radiator and the shell.

Within the confines of the annular radiator 35 is disposed a cylindrical radiator 50. This radiator is constructed with a cylindrical wall 51 and a radial end wall 52 connected therewith. These parts may be spun or stamped from a single piece of sheet metal. The wall 51 terminates in an outwardly directed flange 53. Radiator 50 further comprises an end wall 54 which is formed with a sleeve portion 55 fitting within the cylindrical wall 51 of said radiator. A flange 56 on the end of the sleeve portion 55 overlies flange 53. These two flanges may be welded or brazed together to form a fluid tight connection therebetween. By means of this construction a chamber 57 is formed upon the interior of the radiator which is fluid tight. The radiator 50 is spaced from the radiator 35 to provide an annular air circulating passageway 147 therebetween in communication with the air passageway 49. Wall 52 of this radiator is further spaced from the wall 31 of shell 24 to provide a radial air passageway 65 communicating with the passageway 147.

For the purpose of supporting the toroidal radiator 35 within the shell 24 a number of bolts 58 are employed which pass through the wall 41 of said radiator and are welded or brazed to the same. These bolts extend outwardly from the radiator and are adapted to pass through the end wall 31 of shell 24. Sleeves 59 encircle said bolts and serve to hold the radiator 35 properly spaced from the shell 24. Nuts 60 screwed upon the ends of the bolts 58 hold the parts rigidly clamped together and maintain the radiator in proper spaced relation to provide the passageways 48 and 49 previously referred to.

In order to increase the transfer of heat from radiator 35 to the air passing through the air circulating passageway, a number of fins 61 are employed which are best shown in Figs. 2 and 5. These fins are U-shaped having legs 62 and 63 connected together through connecting portions 64. The legs 62 and 63 straddle the radiator 35 and engage the inner surface of the wall 34 of shell 24 and the outer surface of the wall 51 of radiator 50. These fins are constructed with flanges 64 which abut against the surfaces of the radiator and provide a suitable heat conducting connection therebetween. The radiator 50 is partially supported within the shell 24 through the various fins 61 which hold the said radiator in proper position. The radiator 50 is so disposed as to provide a radial air passageway 65 between the wall 52 of said radiator and the wall 31 of the shell 24.

For conducting the heat transfer medium into the radiator 50, said radiator is provided with two bosses 66 which are welded to the wall 54 of the said radiator at diagonally opposed localities. These bosses are internally threaded as indicated at 71 to receive nipples 68 and 69 which screw into the same. The nipples 68 and 69 are externally threaded throughout the length thereof as indicated at 72, to screw into the threads 71 of the bosses 66. Both of these nipples are constructed to provide shoulders 70 which abut against the inner surface of the wall 54 and clamp the bosses 66 against said wall and form a fluid tight connection between the chamber 57 within the radiator 50 and the passageway through said nipples.

The heated fluid of the engine cooling system is conducted into and from the chamber 46 formed in radiator 35 through two nipples 73 and 74. These nipples being identical in construction, only the nipple 73 and its manner of attachment to the radiator will be described in detail. Nipple 73 is constructed of heavy tubular material which is externally threaded throughout its length. The end 76 of this nipple is reduced in diameter and extends through the wall 38 of the radiator being turned over upon the inner surface of said wall by means of which the said nipple is firmly secured to the part 36 of the radiator 35. The joint between the radiator 35 and the said nipple may be welded, brazed or soldered together to form a fluid tight connection. Upon the exterior of this nipple is disposed a sleeve 86 which fits between the radiator 35 and the shell 24. A nut 87 screwed upon the nipple 73 abuts against the wall 29 of said shell and draws the parts together and against said sleeve, this holding the radiator 35 firmly attached to the shell.

The heater is supported upon the dash 17 of the motor vehicle through a construction which will not be described in detail. The rear wall 29 of shell 24 is spun or pressed outwardly as indicated at 77, in Fig. 2 to provide an offset portion 78 parallel with the remainder thereof. To this offset portion is attached a stiffening member 79 which is constructed with a base portion 80 and two legs 81 and 82 extending outwardly therefrom. The base portion 80 is riveted to the part 78 of wall 29 through rivets 83. The legs 81 and 82 terminate in feet 84 and 85 through which the nipples 73 and 74 extend. In the construction of the radiator, nuts 89 and 90 are first screwed upon the nipples 73 and 74 so that when the stiffening member 78 is applied, said nuts abut against the feet 84 and 85 thereof.

In mounting the heater upon the dash 17 four holes are drilled through the dash through which the two nipples 73 and 74 may extend and through which the two nipples 68 and 69 may extend. Two washers 93 and 94 are next placed upon the two nipples 73 and 74 and the structure applied to the dash so that the said nipples extend through the respective holes therefor. Other washers 95 and 96 are next applied upon the two nipples 73 and 74. Thereafter nuts 91 and 92 are screwed upon the threads 88 of said nipples until the same clamp all of the parts together and support the entire structure through the said nipples. This leaves all of the nipples connected to the two radiators of the heater extending into the compartment 15 of the motor vehicle.

For the purpose of circulating air through the various air circulating passageways of the heater, a number of openings 97 are formed in the front end wall 31 of shell 24. These openings are so disposed as to bring the radial passageway 48 between shell 24 and radiator 35 in communication with the exterior. In addition to these openings other openings 197 are employed which are formed in the wall 29 of the case and which form auxiliary air inlets. In the wall 31 a large central opening 98 is provided which is in communication with the radial passageway 65. Air entering the openings 97 pass along the radial passageway 48 and into the outer annular passageway 47. From there the air passes radially inwardly along the radial passageway 49 and thereafter into annular passageway 147. From said passageway the air passes radially along the passageway 65 leaving the heater through the opening 98. To prevent the air from short circuiting between the inlet and outlet openings of the heater, an annular partition 99 is employed which lies in continuation of the wall 43 of radiator 35 and which extends between the wall 41 of said radiator and the wall 31 of shell 24. This partition is supported upon the ends of the legs 63 of fins 61 and is held in proper position solely through the same.

The flow of air through the heater is impelled by a blower 100 which is operated by a motor 101 attached thereto. These parts will now be described in detail.

The blower 100 consists of a case 102 which is constructed in two parts 103 and 104. These parts are pressed in the desired form to provide a circumferential wall 110 and front and rear radial walls 111 and 112, said parts of the case being connected together through a suitable joint indicated at 105. The case 102 is constructed to provide an inlet opening 106 in the rear wall 112 and an outlet 107 tangentially arranged with respect to the wall 110. At the inlet 106 is formed a flange 108 which projects outwardly from the rear wall 109 of the case. This flange is received within the opening 98. On the wall 31 of shell 24 is constructed a similar flange 113 which extends outwardly from said wall and forms a bearing on which the flange 109 may rotate. A retaining ring 114 disposed upon the interior of the flange 108 holds the case 102 from being disengaged from the shell 24 and at the same time permits of freely rotating the same.

The motor 101 may be of any desired construction and is shown as being formed with a body portion 115 having two end bells 116 and 117 connected thereto and provided with bearings 118 and 119 for journaling the armature shaft 120 of the motor. Motor 101 is attached to the wall 111 of the blower 100 by means of a supporting plate 121 rigidly secured to the end bell 117. This plate is attached to the wall 111 through bolts 123 which pass jointly through the said wall and bracket. Upon the interior of the case 102 is disposed a rotor 124 which is constructed with a hub 125 adapted to be secured to the end of the shaft 120. This rotor is operated by motor 101 and serves to draw air through the inlet opening 98 and to discharge the same through the outlet 107 of the blower. The rotor 125 may be withdrawn from the case 102 through an opening 200 therein, when bolts 123 are removed. The position of the outlet 107 may be adjusted to cause the air to discharge therefrom in any radial direction by rotating the blower 100 about its axis. This is accomplished through the agency of the motor 101 which serves as a handle by means of which the blower may be easily moved to the desired position.

The manner of connecting up the heater to the engine of the vehicle is best illustrated in Fig. 1. Nipple 73 has attached to it a hose 126 which is connected through a suitable connection 127 with the outlet conduit 20 of the cooling system of the engine. In a similar manner a hose 128 is connected through a threaded neck 129 with the upper portion of the water jacket 19 of the engine. The water pump of the engine is indicated at 130 which serves to force the water from the radiator 14 and into the jacket 19. Hose 126 being connected on the pressure side of said water pump, the cooling liquid is forced into the radiator 35 and caused to discharge from the same through hose 128 and back into the water jacket of the engine. The radiator 50 is similarly connected to the exhaust system of the engine. A flexible metal tube 131 is connected to nipple 68 and is further connected through a suitable connection 132 with the exhaust manifold 22. Another flexible metal tube 133 is connected to nipple 69 and may be connected back to the exhaust pipe 23 or permitted to exhaust directly into the atmosphere. By means of a suitable deflector disposed within the manifold 22 such as is now in common use for the purpose, a portion of the exhaust gas from the manifold may be directed into tube 131 and caused to circulate through radiator 50 being discharged therefrom through tube 133.

When the engine is normally operating, a portion of the cooling liquid of the engine and a portion of the exhaust gas is being simultaneously circulated through the two radiators of the heater. When motor 101 is operated the air is drawn through the air circulating passageways of the heater and along the two radiators. As the air enters the passageways 48—47 the same is heated by the cooling liquid contained in radiator 35. The temperature of the cooling liquid being considerably lower than the temperature of the exhaust gases, the air is only partially heated in passing through these passageways. The temperature of the shell 24 is hence relatively low and may be readily touched by the hand without danger of burning or any discomfort whatsoever.

When the air enters passageway 147 the same is both heated by cooling liquid in the radiator 35 and the exhaust gas passing through the radiator 50. This greatly increases the temperature of the air and when the same passes through passageway 65, the temperature is further increased. It can thus be readily comprehended that air leaving the blower 100 through the outlet 107 is at a considerably higher temperature than would be possible were a cooling liquid heater alone used. Furthermore the temperature of the air is considerably below that of an ordinary exhaust heater due to the following reason. Inasmuch as the temperature of the radiator 35 is considerably lower than that of the radiator 50, the heat absorbed by the air in passing through passageway 147 from radiator 50 is partly transferred to radiator 35 and thereafter transferred to the cooling liquid. The air upon leaving the blower 100 has therefore been tempered through the action of the cooling liquid radiator and is at the most suitable temperature and condition for use in the cab of the motor vehicle.

To prevent vibrations being set up in the radiator 50 a sound insulating pad 150 is employed which is placed against the inner surface of the wall 52 of said radiator and covers the same. This pad is constructed of mineral wool, asbestos fibers or some other similar sound insulating and fireproof material. A screen 151 covers the said pad and holds the same in position against the wall 52. Suitable angle clips 152 secured to the wall 51 hold the screen 151 in place. When the exhaust gas entering radiator 50 strikes the pad 150 the surplus energy of the gas is absorbed by the pad and vibration of the radiator prevented.

By means of my improved heater a more nearly uniform temperature can be procured in the air leaving the heater due to the use of the two sources of heat for heating the same. As the heat from the water drops when the speed of the motor increases, the heat from the exhaust correspondingly increases and the temperature is more or less maintained at the proper degree. With my invention the temperature of the cooling liquid can be decidedly reduced thereby increasing the efficiency of the engine and eliminating danger of evaporation of the non-freezing chemical usually employed with cooling fluids. By arranging the exhaust radiator upon the interior of the heater and within the water radiator, heat losses from the shell forming the case of the heater is greatly reduced. By employing a cooling liquid chamber encircling the exhaust radiator and by means of the special construction employed in the exhaust radiator, the noises both from the blower and the exhaust passing through the radiator are greatly dampened and deadened. By the arrangement of radiators and shell the temperature of the shell is exceedingly low so that danger of burning or injury to the person of the occupant is entirely eliminated. The blower can be adjusted at will to control the direction of the air discharged therefrom by rotating the blower through the agency of the motor which serves as a handle by means of which the said blower may be manipulated.

Changes in the specific form of my invention, as herein disclosed, may be made within the scope of what is claimed without departing from the spirit of my invention.

Having described my invention, what I claim as new and desire to protect by Letters Patent is:

1. A heater for use on motor vehicles having an engine provided with an exhaust system and a liquid cooling system, said heater including means forming an air circulating passageway, means connected to the exhaust system for heating the air passing through said passageway, and means connected with the liquid cooling system for tempering the air passing through said passageway.

2. In a heater, an air circulating conduit, an exhaust conduit arranged in heat conducting relation to one portion of said air circulating conduit and a water conduit arranged in heat conducting relation to another portion of said air circulating conduit and separate inlets and outlets for said exhaust conduit and said water conduit.

3. In a heater, a toroidal radiator, a shell encircling said radiator and spaced therefrom to form an air passageway therebetween, a cylindrical radiator within said toroidal radiator spaced therefrom to leave an air passageway therebetween, means between said cylindrical radiator and shell for conducting air from one of said passageways into the other passageway, and inlets and outlets to said radiators.

4. In a heater, a toroidal radiator, a shell encircling said radiator and spaced therefrom to form an air passageway therebetween, a cylindrical radiator within said toroidal radiator, spaced therefrom to leave an air passageway therebetween, a wall at the end of said radiators, said wall having an opening therein for conducting air from the exterior and into one of said passageways and having another opening communicating with the other of said passageways, and air impelling means supported on said wall and communicating with one of said openings for impelling the flow of air through said passageways.

5. In a heater, a cylindrical shell having an end wall, a toroidal radiator within said shell spaced from said shell and from said end wall, a cylindrical radiator within said toroidal radiator and spaced from said toroidal radiator and said end wall, said toroidal radiator forming in conjunction with said shell and cylindrical radiator annular passageways, means for bringing said passageways into communication, the end wall of said shell having an opening therethrough communicating with one of said passageways and leading to the exterior, and air impelling means carried by said end wall and operating to withdraw air from said other passageway and to discharge the same from the heater.

6. In a heater, a cylindrical case having a cylindrical wall and two end walls, a toroidal radiator within said shell spaced from all of the walls thereof to form an annular air passageway and two radial passageways, a cylindrical radiator within said shell having a cylindrical wall spaced from said toroidal radiator and a radial wall spaced from one of the end walls of the shell to provide an annular passageway and a radial passageway, said annular passageway being in communication with the other annular passageway through one of said first named radial passageways, the wall of the shell forming the other radial passageway having an opening therein communicating with said radial passageway, air impelling means carried by said last named wall, said air impelling means being in communication with the radial passageway formed by the end wall of the case and the end wall of the cylindrical radiator and means for operating said air impelling means to procure movement of air through said air passageways.

7. In a heater, an exhaust conduit and a water conduit arranged in juxtaposition, means forming in conjunction with said conduits an air circulating passageway by means of which heat exchange may be had between both the conduits and the air passing through said passageway and separate inlets and outlets for said exhaust conduit and said water conduit.

8. In a heater, a water radiator and an exhaust radiator, said radiators being positioned adjacent one another to provide an air circulating space therebetween and separate inlets and outlets for said radiators.

9. In a heater, a case containing a radiator provided with an air circulating passageway, said case having an opening therein, a blower having an inlet communicating with said opening, means for rotatably supporting said blower for rotation about an axis concentric with the axis of said opening, said blower being mounted to project outwardly from said case and having an outlet being adapted to be turned at different angles, and a motor mounted on said blower and extending outwardly therefrom for operating the rotor of said blower, said motor serving as a handle for turning said case to present the outlet thereof in the desired direction.

10. In a heater, a case, two radiators disposed within said case, four nipples carried by the case and arranged in the form of a rhomboid, diagonally spaced nipples being connected to the same radiator, and means connected to said nipples for conducting heat transferring mediums to said radiators.

11. A heater for use on motor vehicles having an engine provided with an exhaust system and a liquid cooling system, said heater including two radiators arranged to form an air passageway such that heat exchange may occur between both radiators and the air passing through said passageway, means for connecting one of said radiators with the exhaust system of the engine, and means for connecting the other radiator with the liquid cooling system of the engine.

12. A heater for use on motor vehicles having an engine provided with an exhaust system and a liquid cooling system, said heater including an air circulating conduit, two heating conduits arranged in heat conducting relation to said air circulating conduit, means for connecting one of said conduits to the exhaust system of the engine and means for connecting the other conduit to the liquid cooling system of the engine.

13. In an exhaust heater, a radiator having front and rear walls and forming a chamber, an inlet to said radiator extending through the rear wall for conducting exhaust gas into said chamber, a sound deadening pad overlying the front wall of the radiator, and an outlet for said radiator disposed in said rear wall.

14. In an exhaust heater, a radiator having a number of walls forming a chamber in the radiator, an inlet in one of said walls for conducting exhaust gas into said chamber, a single sound deadening pad overlying the wall opposite the wall in which the inlet is disposed, said pad having an area greater than the area of said inlet and being disposed directly opposite said inlet, and an outlet for said radiator disposed in a wall thereof other than the wall which the pad overlies.

15. In an exhaust heater, a radiator having a wall structure forming a chamber in the radiator, an inlet in said wall structure for conducting exhaust gas into said chamber, a sound deadening pad overlying the wall structure opposite the inlet and resting throughout its area against the same, and an outlet in said wall structure, said outlet being remotely disposed from said pad.

16. In an exhaust heater, a radiator having a wall structure forming a chamber in the radiator, an inlet in said wall structure for conducting exhaust gas into said chamber, a sound deadening pad overlying the wall structure opposite the inlet and resting throughout its area against the same, and an outlet in said wall structure, said outlet being disposed in a manner to direct the exhaust gas out of the chamber in a direction opposite to the direction of entry.

17. In an exhaust heater, a radiator having two parallel walls and forming a chamber, an inlet to the radiator extending through one of the walls for conducting exhaust gas into the chamber, a sound deadening pad overlying the opposite wall and disposed directly opposite said inlet, and an outlet for said radiator disposed in said first named wall.

18. In an exhaust heater, a radiator having a wall structure forming a chamber in the radiator, an inlet in said wall structure for conducting exhaust gas into said chamber, an imperforate sound deadening pad overlying the wall structure opposite the inlet, and an outlet in said wall structure, said outlet being remotely disposed in a manner to direct the exhaust gas out of the chamber in a direction opposite to the direction of entry therein.

IRVING E. ASKE.